US012080500B2

(12) United States Patent
Otsuka et al.

(10) Patent No.: US 12,080,500 B2
(45) Date of Patent: Sep. 3, 2024

(54) ELECTROMAGNETIC RELAY WITH SEAL BETWEEN CANTACT CASE AND DRIVE DEVICE

(71) Applicant: OMRON Corporation, Kyoto (JP)

(72) Inventors: Kohei Otsuka, Yamaga (JP); Ryota Minowa, Yamaga (JP); Hiroyuki Iwasaka, Yamaga (JP); Hiroyuki Harimochi, Kyoto (JP); Shinichi Ogawa, Yamaga (JP); Naoki Kawaguchi, Yamaga (JP)

(73) Assignee: OMRON CORPORATION, Kyoto (JP)

( * ) Notice: Subject to any disclaimer, the term of this patent is extended or adjusted under 35 U.S.C. 154(b) by 113 days.

(21) Appl. No.: 17/765,840

(22) PCT Filed: Sep. 18, 2020

(86) PCT No.: PCT/JP2020/035429
§ 371 (c)(1),
(2) Date: Apr. 1, 2022

(87) PCT Pub. No.: WO2021/075205
PCT Pub. Date: Apr. 22, 2021

(65) Prior Publication Data

US 2022/0375707 A1 Nov. 24, 2022

(30) Foreign Application Priority Data

Oct. 15, 2019 (JP) ................................ 2019-188483

(51) Int. Cl.
*H01H 50/58* (2006.01)
*H01H 50/02* (2006.01)
(Continued)

(52) U.S. Cl.
CPC ............ *H01H 50/58* (2013.01); *H01H 50/02* (2013.01); *H01H 50/14* (2013.01); *H01H 50/60* (2013.01); *H01H 2205/002* (2013.01)

(58) Field of Classification Search
None
See application file for complete search history.

(56) References Cited

U.S. PATENT DOCUMENTS

2009/0039990 A1 2/2009 Usami et al.
2009/0243771 A1 10/2009 Uruma et al.
(Continued)

FOREIGN PATENT DOCUMENTS

CN 204480969 U 7/2015
CN 110323107 A 10/2019
(Continued)

OTHER PUBLICATIONS

Machine translation of JP2018163761A (Year: 2018).*
(Continued)

*Primary Examiner* — Bernard Rojas
(74) *Attorney, Agent, or Firm* — Shinjyu Global IP

(57) ABSTRACT

An electromagnetic relay includes a fixed contact, a movable contact piece, a movable contact, a contact case, a drive device, and an elastic member. The movable contact is disposed to face the fixed contact. The movable contact piece is connected to the movable contact. The movable contact piece is configured to move in an opening direction and a closing direction. The contact case houses the fixed contact, the movable contact, and the movable contact piece. The drive device includes a coil. The coil generates an electromagnetic force that moves the movable contact piece. The elastic member is disposed between the drive device and the contact case. The elastic member seals between the drive device and the contact case.

13 Claims, 12 Drawing Sheets

(51) Int. Cl.
*H01H 50/14* (2006.01)
*H01H 50/60* (2006.01)

(56) References Cited

U.S. PATENT DOCUMENTS

| | | | | |
|---|---|---|---|---|
| 2011/0156845 | A1* | 6/2011 | Eum | H01H 51/065 335/154 |
| 2018/0061599 | A1* | 3/2018 | Enomoto | H01H 50/08 |
| 2018/0197707 | A1* | 7/2018 | Takaya | H01H 50/14 |
| 2019/0304728 | A1 | 10/2019 | Minowa et al. | |

FOREIGN PATENT DOCUMENTS

| | | | |
|---|---|---|---|
| JP | 11-153073 | A | 6/1999 |
| JP | 2006-260984 | A | 9/2006 |
| JP | 2007-287524 | A | 11/2007 |
| JP | 2009-59682 | A | 3/2009 |
| JP | 2018-163761 | A | 10/2018 |

OTHER PUBLICATIONS

The International Search Report of International Application No. PCT/JP2020/035429 issued on Dec. 1, 2020.
The Written Opinion of the International Searching Authority of International Application No. PCT/JP2020/035429 issued on Dec. 1, 2020.
Office Action of the corresponding Chinese Application No. 202080067566.X mailed on Jul. 13, 2024.

* cited by examiner

ELECTROMAGNETIC RELAY WITH SEAL BETWEEN CANTACT CASE AND DRIVE DEVICE

CROSS-REFERENCE TO RELATED APPLICATION

This application is the U.S. National Phase of International Application No. PCT/JP2020/035429, filed on Sep. 18, 2020. This application claims priority to Japanese Patent Application No. 2019-188483, filed Oct. 15, 2019. The contents of those applications are incorporated by reference herein in their entireties.

FIELD

The present invention relates to an electromagnetic relay.

BACKGROUND

An electromagnetic relay includes a contact case. For example, as in Japan Laid-open Patent Application Publication No. 2018-163761, the contact case accommodates a movable contact, a fixed contact, and a movable contact piece. Some electromagnetic relays are required to be airtight in the contact case. In such electromagnetic relays, the contact case is connected to the yoke or other case by welding. As a result, the inside of the contact case is sealed.

SUMMARY

As described above, when the airtightness in the contact case is provided by welding, the manufacturing man-hours or the cost are increased. An object of the present disclosure is to suppress an increase in manufacturing man-hours or a cost while ensuring airtightness in a contact case.

An electromagnetic relay according to one aspect of the present disclosure includes a fixed contact, a movable contact piece, a movable contact, a contact case, a drive device, and an elastic member. The movable contact is disposed to face the fixed contact. The movable contact piece is connected to the movable contact. The movable contact piece is configured to move in an opening direction and a closing direction. The contact case houses the fixed contact, the movable contact, and the movable contact piece. The drive device includes a coil. The coil generates an electromagnetic force that moves the movable contact piece. The elastic member is disposed between the drive device and the contact case. The elastic member seals between the drive device and the contact case.

In the electromagnetic relay according to the present aspect, a space between the drive device and the contact case is sealed by the elastic member. Therefore, as compared with a case that the sealing is performed by welding, it is possible to suppress an increase in manufacturing man-hours or a cost while ensuring airtightness in the contact case.

The contact case may include an end surface and a step portion. The end surface may face the drive device. The step portion may be disposed inside the end surface. The elastic member may be in contact with the step portion. In this case, the elastic member is positioned by the step portion.

The contact case may include an end surface and a concave groove. The end surface may face the drive device. The concave groove may be disposed inside the end surface. The elastic member may be a seal ring. The elastic member may be disposed in the concave groove. In this case, the elastic member is positioned by the concave groove of the contact case.

The drive device may include a support surface that supports the contact case. The support surface may include a recess. The elastic member may be disposed in the recess. In this case, the elastic member is positioned by the recess of the support surface.

The electromagnetic relay may further include a drive shaft. The drive shaft may be connected to the movable contact piece and may extend from the movable contact piece toward the drive device. The drive device may include a spool, a movable iron core, and a fixed iron core. The coil may be wound around the spool. The movable iron core may be disposed in the spool. The movable iron core may be connected to the drive shaft. The fixed iron core may face the movable iron core. In this case, the movable iron core moves with respect to the fixed iron core due to the electromagnetic force generated by the coil. The drive shaft moves according to a movement of the movable iron core, whereby the movable contact piece moves in the opening direction or the closing direction.

The electromagnetic relay may further include an inner case. The inner case may be disposed in the contact case. The inner case may include a hole into which the drive shaft is inserted. The inner case may be disposed to face the drive device. The elastic member may be disposed between the drive device and the inner case. The elastic member may seal between the drive device and the inner case. In this case, both a space between the drive device and the inner case and a space between the drive device and the contact case are sealed by the elastic member.

The contact case may include an end surface, a first step portion, and a second step portion. The first step portion may be located inside the end surface. The second step portion may be located inside the first step portion. The elastic member may be in contact with the first step portion. The inner case may be in contact with the second step portion. In this case, the elastic member is positioned by the first step portion. Further, the inner case is positioned by the second step portion.

The inner case may include a protrusion that projects toward the elastic member. The elastic member may include a recess that faces the protrusion. The protrusion may be disposed in the recess. In this case, the elastic member is positioned by the protrusion of the inner case.

The elastic member may include a hole into which the drive shaft is inserted. The inner case may be made of resin. The contact case may include a side wall. The side wall may extend in an axial direction of the drive shaft. The side wall may laterally cover the fixed contact, the movable contact, and the movable contact piece. The elastic member may be in contact with the end surface of the side wall. The elastic member may have a sheet shape. The contact case may be made of resin.

DETAILED DESCRIPTION

Figure 1:
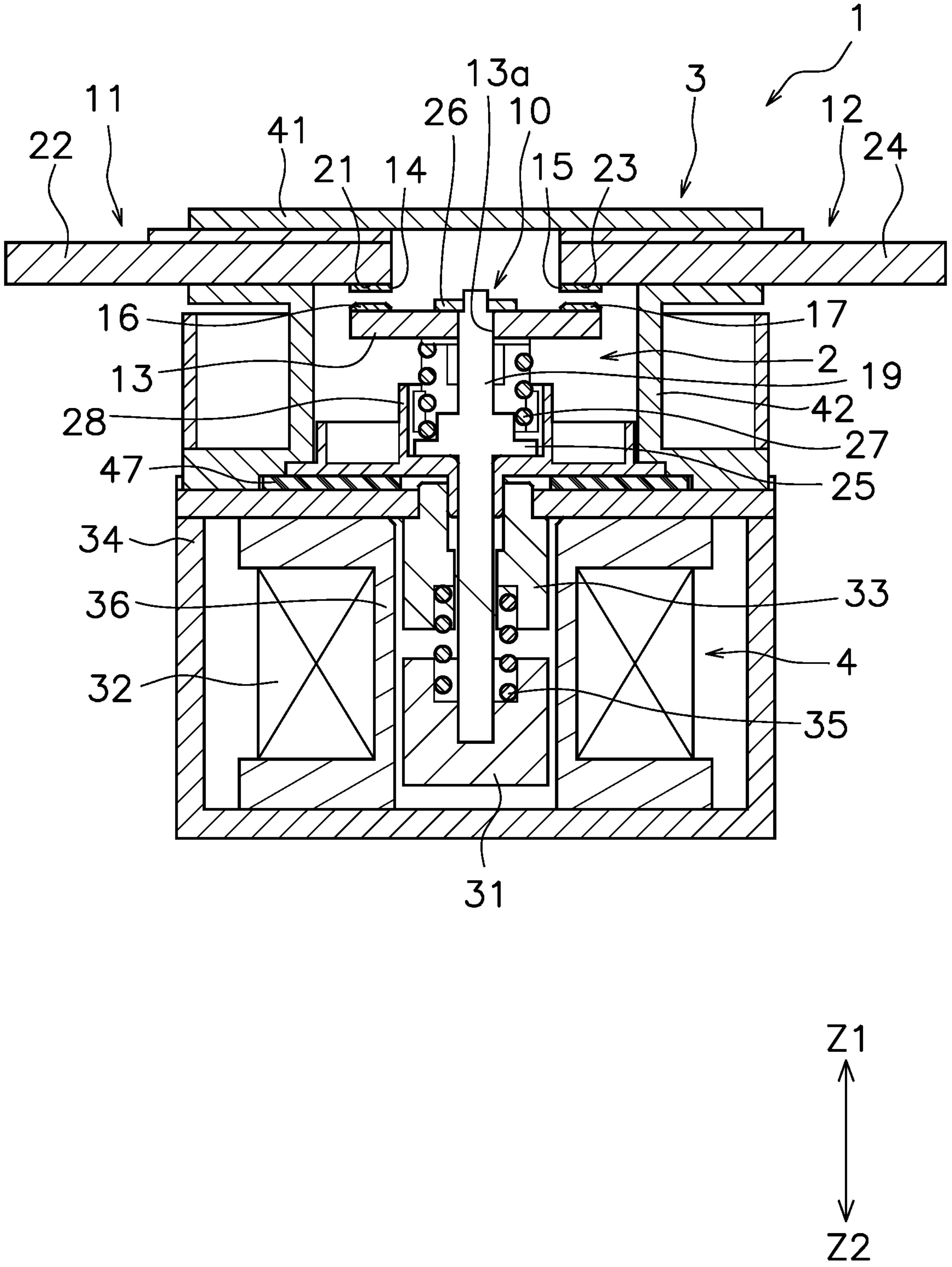
FIG. 1 is a side sectional view of an electromagnetic relay in an open state according to an embodiment.

Hereinafter, an electromagnetic relay 1 according to an embodiment will be described with reference to the drawings. FIG. 1 is a side sectional view of the electromagnetic relay 1 according to the embodiment. As shown in FIG. 1, the electromagnetic relay 1 includes a contact device 2, a contact case 3, and a drive device 4.

In the following description, each of the up, down, left, and right directions means each of the up, down, left, and right directions in FIG. 1. Specifically, a direction from the drive device 4 to the contact device 2 is defined as upward. The direction from the contact device 2 to the drive device 4 is defined as downward. In FIG. 1, a direction intersecting the up-down direction is defined as a left-right direction. A direction intersecting the up-down direction and the left-right direction is defined as a front-back direction. The front-back direction is a direction perpendicular to the paper surface of FIG. 1. However, these directions are defined for convenience of explanation, and do not limit the arrangement direction of the electromagnetic relay 1.

The contact device 2 is disposed in the contact case 3. The contact device 2 includes a movable mechanism 10, a first fixed terminal 11, a second fixed terminal 12, a movable contact piece 13, a first fixed contact 14, a second fixed contact 15, a first movable contact 16, and a second movable contact 17. The first fixed terminal 11 and the second fixed terminal 12 are made of a conductive material such as copper or a copper alloy. The first fixed contact 14 is connected to the first fixed terminal 11. The second fixed contact 15 is connected to the second fixed terminal 12. The first fixed contact 14 and the second fixed contact 15 are disposed apart from each other in the left-right direction.

The first fixed terminal 11 includes a first contact support portion 21 and a first external terminal portion 22. The first contact support portion 21 faces the movable contact piece 13. The first fixed contact 14 is connected to the first contact support portion 21. The first external terminal portion 22 is connected to the first contact support portion 21. The first external terminal portion 22 projects outward from the contact case 3.

The second fixed terminal 12 includes a second contact support portion 23 and a second external terminal portion 24. The second contact support portion 23 faces the movable contact piece 13. The second fixed contact 15 is connected to the second contact support portion 23. The second external terminal portion 24 is connected to the second contact support portion 23. The second external terminal portion 24 projects outward from the contact case 3. Specifically, the first external terminal portion 22 and the second external terminal portion 24 project upward from the contact case 3. However, the first external terminal portion 22 and the second external terminal portion 24 may protrude from the contact case 3 in other directions.

The movable contact piece 13 extends in the left-right direction. The movable contact piece 13 is disposed to face the first contact support portion 21 of the first fixed terminal 11 and the second contact support portion 23 of the second fixed terminal 12 in the up-down direction. The movable contact piece 13 is movably disposed in a closing direction Z1 and an opening direction Z2. The closing direction Z1 is a direction in which the movable contact piece 13 is close to the first fixed terminal 11 and the second fixed terminal 12 (the upward direction in FIG. 1). The opening direction Z2 is a direction in which the movable contact piece 13 is separated from the first fixed terminal 11 and the second fixed terminal 12 (the downward direction in FIG. 1).

The first movable contact 16 and the second movable contact 17 are connected to the movable contact piece 13. The first movable contact 16 and the second movable contact 17 are disposed apart from each other in the left-right direction. The first movable contact 16 faces the first fixed contact 14 in the up-down direction. The second movable contact 17 faces the second fixed contact 15 in the up-down direction.

The movable mechanism 10 supports the movable contact piece 13. The movable mechanism 10 is movably disposed in the closing direction Z1 and the opening direction Z2 together with the movable contact piece 13. The movable mechanism 10 includes a drive shaft 19, a first holding member 25, a second holding member 26, and a contact spring 27. The drive shaft 19 extends in the up-down direction. The drive shaft 19 is connected to the movable contact piece 13. The drive shaft 19 extends from the movable contact piece 13 toward the drive device 4. The movable contact piece 13 is provided with a hole 13*a*. The drive shaft 19 is inserted into the hole 13*a*. The movable contact piece 13 is relatively movable in the closing direction Z1 and the opening direction Z2 with respect to the drive shaft 19.

Figure 2:
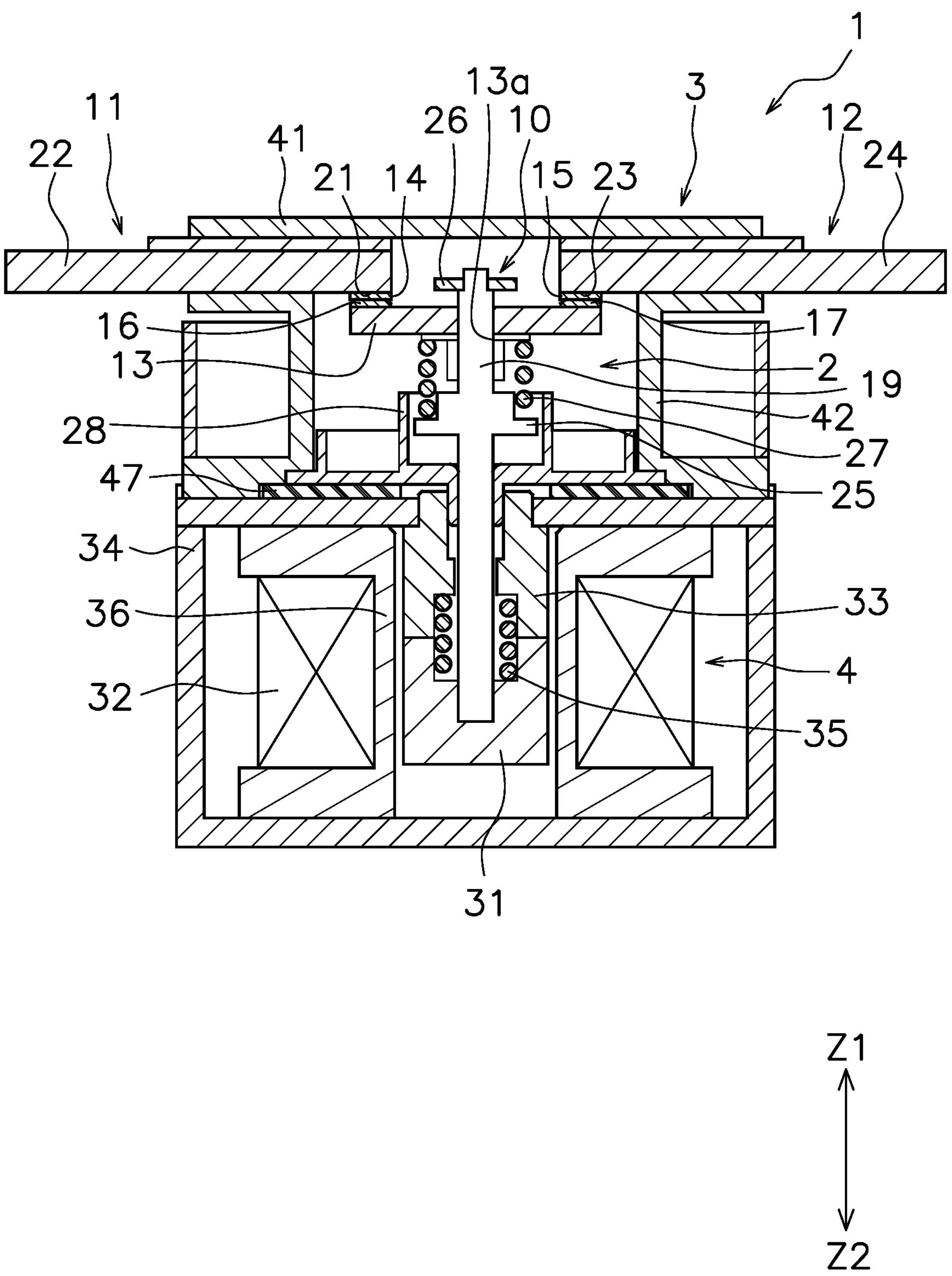
FIG. 2 is a side sectional view of the electromagnetic relay in a closed state.

The drive shaft 19 is movable between a closed position and an open position. FIG. 1 shows the drive shaft 19 in the open position. As shown in FIG. 1, in a case that the drive shaft 19 is located in the open position, the movable contacts 16 and 17 are separated from the fixed contacts 14 and 15. FIG. 2 shows the drive shaft 19 in the closed position. As shown in FIG. 2, in a case that the drive shaft 19 is located in the closed position, the movable contacts 16 and 17 are in contact with the fixed contacts 14 and 15.

The first holding member 25 is fixed to the drive shaft 19. The contact spring 27 is disposed between the movable contact piece 13 and the first holding member 25. The contact spring 27 urges the movable contact piece 13 in the closing direction Z1 in a state where the movable contacts 16 and 17 are in contact with the fixed contacts 14 and 15. The second holding member 26 is fixed to the drive shaft 19. The movable contact piece 13 is located between the second holding member 26 and the contact spring 27.

The drive device 4 operates the movable contact piece 13 by an electromagnetic force. The drive device 4 moves the movable mechanism 10 in the closing direction Z1 and the opening direction Z2. As a result, the drive device 4 moves the movable contact piece 13 in the closing direction Z1 and the opening direction Z2. The drive device 4 includes a movable iron core 31, a coil 32, a spool 36, a fixed iron core 33, a yoke 34, and a return spring 35.

The coil 32 is wound around the spool 36. The movable iron core 31 is connected to the drive shaft 19. The movable iron core 31 is disposed in the spool 36. The movable iron core 31 is movable in the closing direction Z1 and the opening direction Z2. The coil 32 generates the electromagnetic force that moves the movable iron core 31 in the closing direction Z1 when energized. The fixed iron core 33 is disposed to face the movable iron core 31. The return spring 35 is disposed between the movable iron core 31 and the fixed iron core 33. The return spring 35 urges the movable iron core 31 in the opening direction Z2.

The yoke 34 is disposed so as to surround the coil 32. The yoke 34 is disposed on a magnetic circuit configured by the coil 32. The yoke 34 is disposed above the coil 32, on the lateral side of the coil 32, and below the coil 32.

Figure 3:
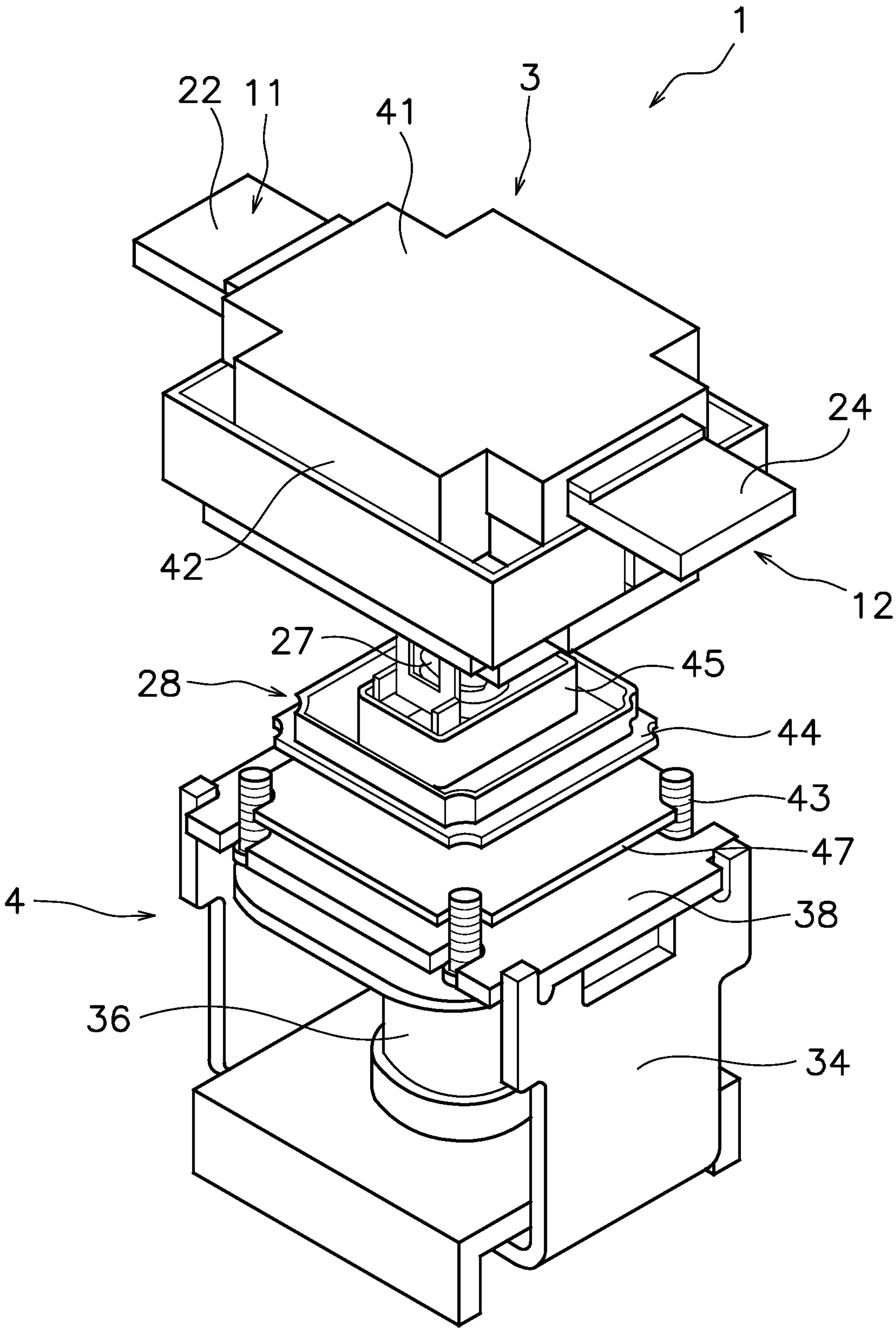
FIG. 3 is an exploded perspective view of the electromagnetic relay.
Figure 4:
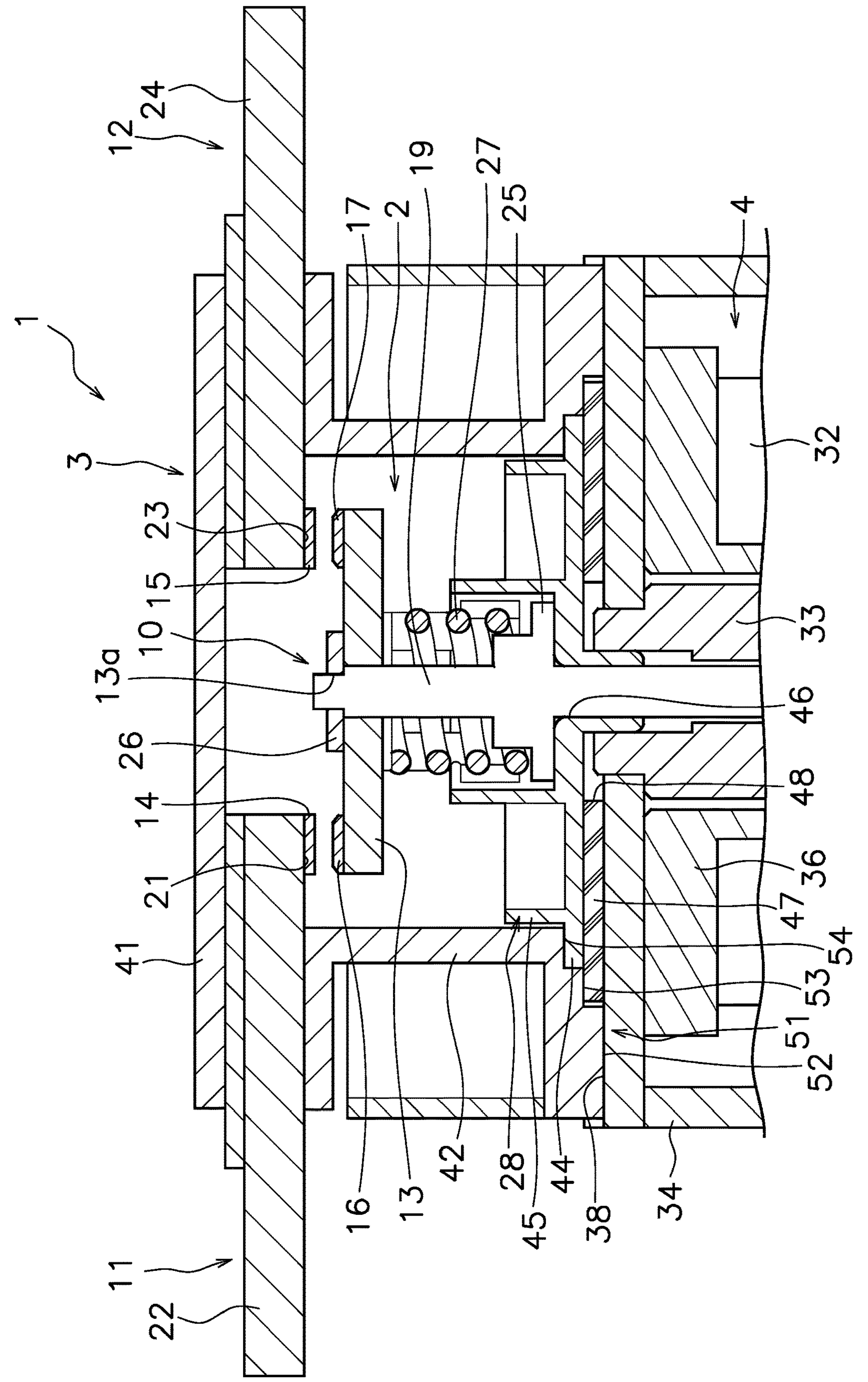
FIG. 4 is an enlarged sectional view of the electromagnetic relay.

FIG. 3 is an exploded perspective view of the electromagnetic relay 1. FIG. 4 is an enlarged cross-sectional view of the electromagnetic relay 1. As shown in FIG. 3, the contact case 3 is fixed to the drive device 4 by a screw 43. The contact case 3 is made of resin. In FIG. 3, the reference numeral 43 is attached to only one of the plurality of screws 43, and the reference numerals of the other screws are omitted. The contact case 3 may be fixed to the drive device 4 by a fixing means other than a screw.

As shown in FIGS. 3 and 4, the contact case 3 includes a top surface 41 and a side wall 42. The top surface 41 is disposed above the movable contact piece 13. The side wall 42 extends downward from the top surface 41. The side wall 42 covers the first fixed contact 14, the second fixed contact 15, the first movable contact 16, the second movable contact 17, and the movable contact piece 13 from the lateral side. As shown in FIG. 4, the contact case 3 includes an end surface 51 that faces the drive device 4. The end surface 51 includes a bottom end surface 52, a first step portion 53, and a second step portion 54. The first step portion 53 is located inside the bottom end surface 52. The first step portion 53 has a shape recessed upward from the bottom end surface 52. The second step portion 54 is located inside the first step portion 53. The second step portion 54 has a shape recessed upward from the first step portion 53.

The electromagnetic relay 1 includes an inner case 28. The inner case 28 is made of resin. The inner case 28 is disposed in the contact case 3. The inner case 28 includes a bottom surface portion 44 and a wall portion 45. The bottom surface portion 44 has a flat shape. The bottom surface portion 44 includes a hole 46. The drive shaft 19 is inserted into the hole 46. An inner diameter of the hole 46 is smaller than an outer shape of the first holding member 25. Therefore, when the first holding member 25 contacts the bottom surface portion 44, the movement of the drive shaft 19 in the opening direction Z2 is restricted. The wall portion 45 extends upward from the bottom surface portion 44. The wall portion 45 covers the contact spring 27 from the lateral side.

The electromagnetic relay 1 includes an elastic member 47. The elastic member 47 is made of an elastic material such as rubber or urethane. The elastic member 47 has a sheet shape. The elastic member 47 includes a hole 48 into which the drive shaft 19 is inserted. The elastic member 47 is disposed between the drive device 4 and the contact case 3. The elastic member 47 seals between the drive device 4 and the contact case 3. The elastic member 47 is disposed between the drive device 4 and the inner case 28. The elastic member 47 seals between the drive device 4 and the inner case 28.

Specifically, the drive device 4 includes a support surface 38. The support surface 38 contacts the end surface 51 of the contact case 3 and supports the contact case 3. The support surface 38 is an upper surface of the yoke 34. The support surface 38 faces the end surface 51 of the contact case 3. The support surface 38 faces the bottom surface portion 44 of the inner case 28.

Figure 5:
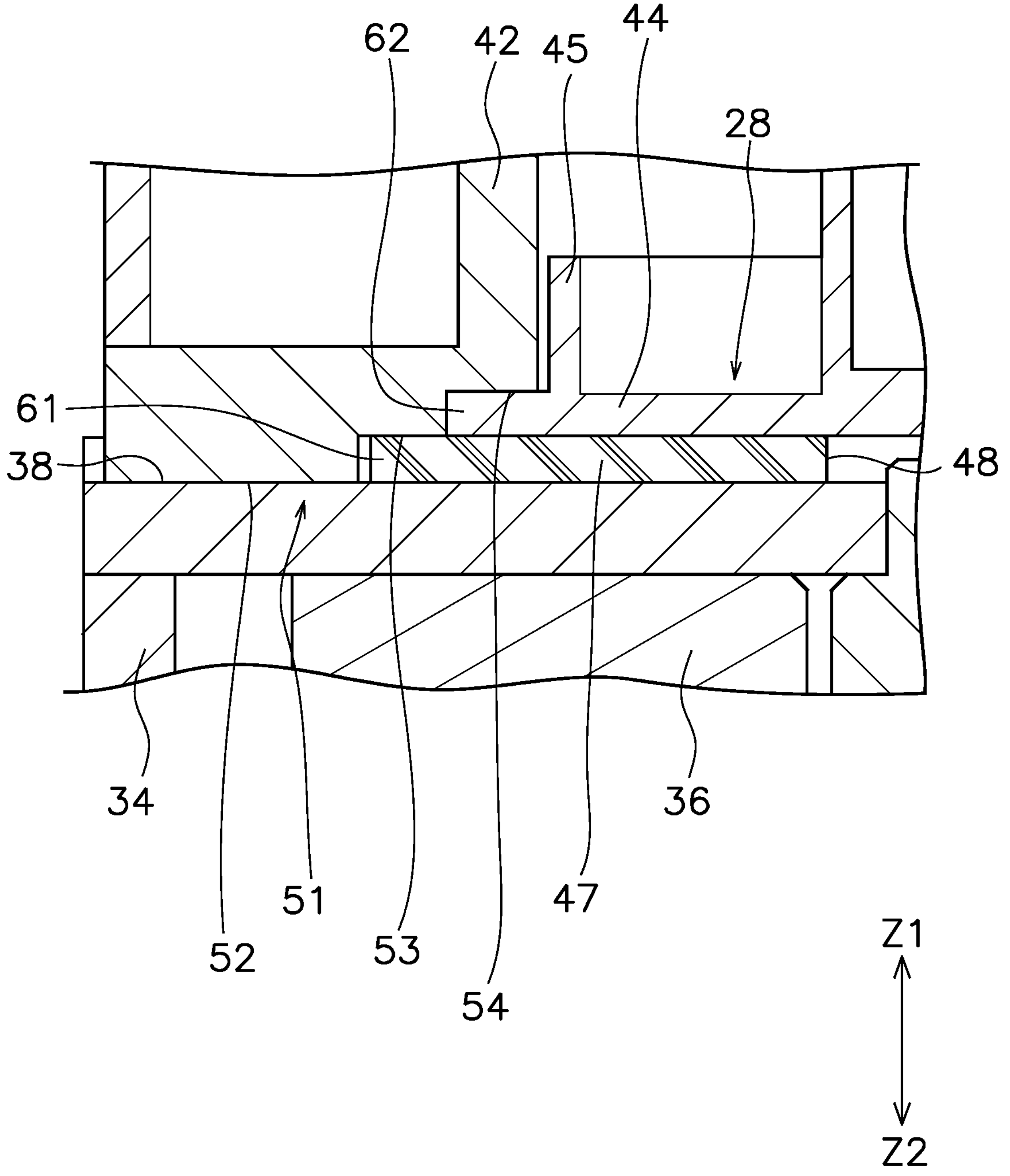
FIG. 5 is an enlarged sectional view of an elastic member and its surroundings.

The first step portion 53 has a shape corresponding to the outer shape of the elastic member 47. For example, as shown in FIG. 3, the outer shape of the elastic member 47 is a substantially quadrangle. Therefore, the first step portion 53 has a quadrangular shape. Alternatively, if the outer shape of the elastic member is circular, the first step portion 53 may have a circular shape. The elastic member 47 is sandwiched between the support surface 38 and the first step portion 53 of the contact case 3. The elastic member 47 is in contact with the first step portion 53 and the support surface 38. FIG. 5 is an enlarged view of the elastic member 47 and its surroundings. As shown in FIG. 5, an end portion 61 of the elastic member 47 is sandwiched between the first step portion 53 of the contact case 3 and the support surface 38. As a result, the elastic member 47 seals between the end surface 51 of the contact case 3 and the support surface 38 of the yoke 34.

The second step portion 54 has a shape corresponding to the outer shape of the bottom surface portion 44. As shown in FIG. 3, the outer shape of the bottom surface portion 44 is a substantially quadrangle. Therefore, the second step portion 54 has a quadrangular shape. Alternatively, if the outer shape of the bottom surface portion 44 is circular, the second step portion 54 may have a circular shape. The elastic member 47 is sandwiched between the bottom surface portion 44 of the inner case 28 and the support surface 38. The elastic member 47 is in contact with the bottom surface portion 44 of the inner case 28 and the support surface 38. The inner case 28 is sandwiched between the second step portion 54 and the elastic member 47. The inner case 28 is in contact with the second step portion 54 and the elastic member 47. As shown in FIG. 5, an end portion 62 of the bottom surface portion 44 is sandwiched between the second step portion 54 and the elastic member 47. As a result, the elastic member 47 seals between the bottom surface portion 44 of the inner case 28 and the support surface 38 of the yoke 34.

Next, the operation of the electromagnetic relay 1 will be described. When the coil 32 is not energized, the drive device 4 is not magnetized. In this case, the drive shaft 19 is pressed in the opening direction Z2 by the elastic force of the return spring 35 together with the movable iron core 31. Therefore, the drive shaft 19 is located at the open position shown in FIG. 1. In this state, the movable contact piece 13 is also pressed in the opening direction Z2 via the movable mechanism 10. Therefore, when the drive shaft 19 is in the open position, the first movable contact 16 and the second movable contact 17 are separated from the first fixed contact 14 and the second fixed contact 15.

When the coil 32 is energized, the drive device 4 is magnetized. In this case, due to the electromagnetic force of the coil 32, the movable iron core 31 moves in the closing direction Z1 against the elastic force of the return spring 35. As a result, the drive shaft 19 and the movable contact piece 13 both move in the closing direction Z1. Therefore, as shown in FIG. 2, the drive shaft 19 moves to the closed position. As a result, as shown in FIG. 2, when the drive shaft 19 is in the closed position, the first movable contact 16 and the second movable contact 17 contact the first fixed contact 14 and the second fixed contact 15, respectively.

When the current to the coil 32 is stopped and degaussed, the movable iron core 31 is pressed in the opening direction Z2 by the elastic force of the return spring 35. As a result, the drive shaft 19 and the movable contact piece 13 both move in the opening direction Z2. Therefore, as shown in FIG. 1, the movable mechanism 10 moves to the open position. As a result, when the movable mechanism 10 is in the open position, the first movable contact 16 and the second movable contact 17 are separated from the first fixed contact 14 and the second fixed contact 15.

In the electromagnetic relay 1 according to the present embodiment described above, the space between the drive device 4 and the contact case 3 is sealed by the elastic member 47. Therefore, as compared with the case where the sealing is performed by welding, it is possible to suppress an increase in manufacturing man-hours or a cost while ensuring airtightness in the contact case 3. Further, it is possible to prevent the sound generated in the contact case 3 when opening and closing the contacts from leaking to the outside. Thereby, the noise can be reduced.

In the electromagnetic relay 1 according to the present embodiment, the degree of freedom of the material of the contact case 3 is higher than that in the case where the sealing is performed by welding. Therefore, the manufacturing man-hours or the cost can be reduced.

Although one embodiment of the present invention has been described above, the present invention is not limited to the above embodiment, and various modifications can be made without departing from the gist of the invention.

In the above embodiment, the drive device 4 pushes the drive shaft 19 from the drive device 4 side, so that the movable contact piece 13 moves in the closing direction Z1. Further, when the drive device 4 pulls the drive shaft 19 toward the drive device 4, the movable contact piece 13 moves in the opening direction Z2. However, the operating direction of the drive shaft 19 for opening and closing the contacts may be opposite to that of the above embodiment. That is, the movable contact piece 13 may move in the closing direction Z1 by the drive device 4 pulling the drive shaft 19 toward the drive device 4. The movable contact piece 13 may move in the opening direction Z2 by pushing the drive shaft 19 from the drive device 4 side by the drive device 4. That is, the closing direction Z1 and the opening direction Z2 may be opposite to the above-described embodiment.

The shape or arrangement of the first fixed terminal 11, the second fixed terminal 12, or the movable contact piece 13 may be changed. For example, the first external terminal portion 22 and the second external terminal portion 24 may protrude from the contact case 3 in the left-right direction. Alternatively, the first external terminal portion 22 and the second external terminal portion 24 may protrude from the contact case 3 in the front-rear direction. The shape or arrangement of the movable iron core 31, the coil 32, the fixed iron core 33, or the yoke 34 may be changed. The shape or arrangement of the first fixed contact 14, the second fixed contact 15, the first movable contact 16, or the second movable contact 17 may be changed.

The first fixed contact 14 may be a separate body from the first fixed terminal 11 or may be integrated with the first fixed terminal 11. The second fixed contact 15 may be a separate body from the second fixed terminal 12 or may be integrated with the second fixed terminal 12. The first movable contact 16 may be a separate body from the movable contact piece 13, or may be integrated with the movable contact piece 13. The second movable contact 17 may be a separate body from the movable contact piece 13, or may be integrated with the movable contact piece 13.

The contact case 3 is not limited to resin, and may be made of metal or ceramic. The inner case 28 is not limited to resin, and may be made of metal or ceramic. The shape of the contact case 3 is not limited to that of the above embodiment, and may be changed. The shape of the inner case 28 is not limited to that of the above embodiment, and may be changed. The elastic member 47 is not limited to that of the above embodiment, and may be changed. For example, the elastic member 47 is not limited to the O-ring, and may be a seal ring having another cross-sectional shape such as a square shape or a V-shape.

Figure 6:
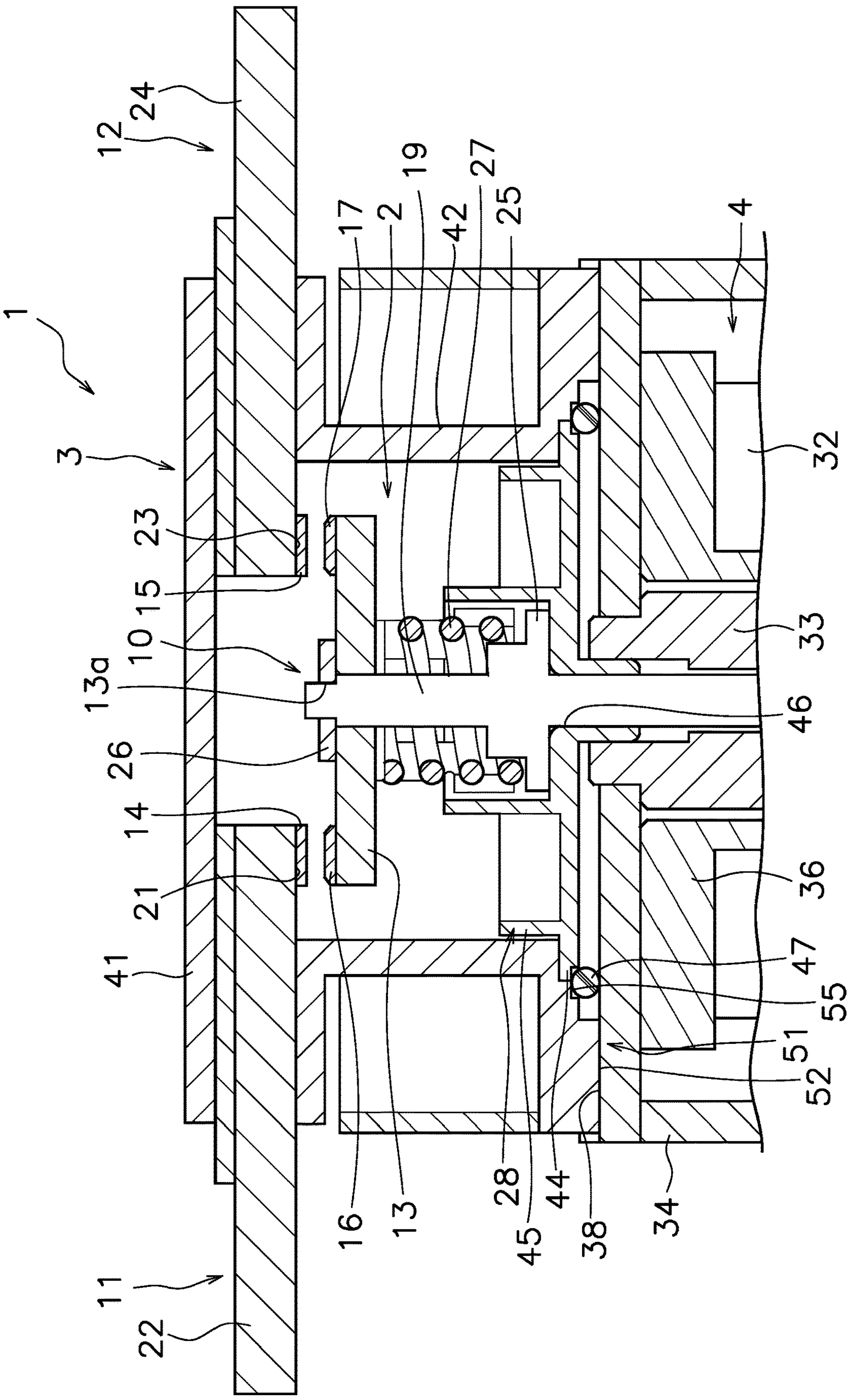
FIG. 6 is an enlarged sectional view of the electromagnetic relay according to a first modification.
Figure 7:
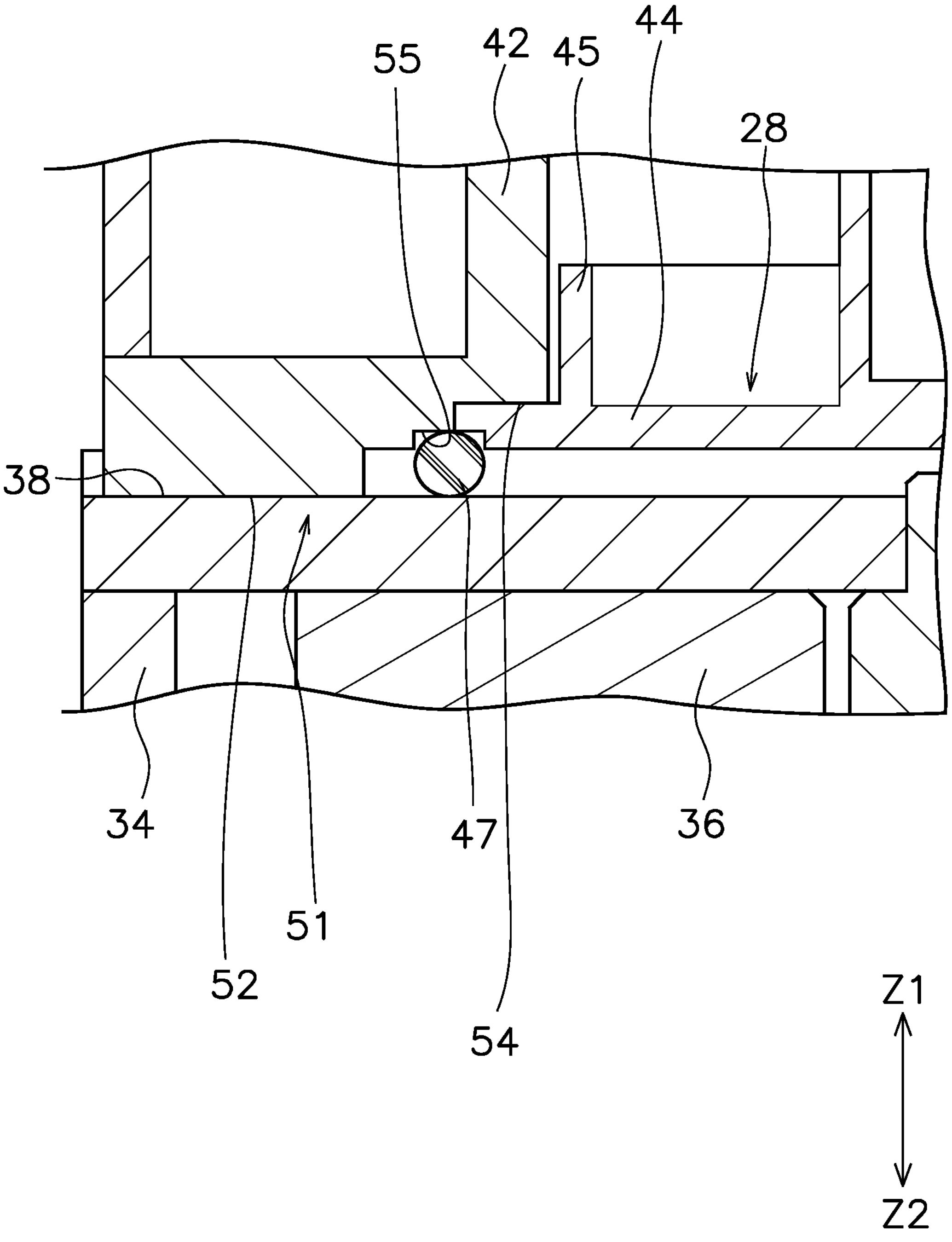
FIG. 7 is an enlarged cross-sectional view of the elastic member and its surroundings according to the first modification.

FIG. 6 is an enlarged cross-sectional view of the electromagnetic relay 1 according to a first modification. FIG. 7 is an enlarged view of the elastic member 47 and its surroundings. In the first modification, the end surface 51 of the contact case 3 and the bottom surface portion 44 of the inner case 28 include a concave groove 55. The concave groove 55 has an annular shape. The concave groove 55 is located inside the bottom end surface 52. The elastic member 47 is an O-ring. The elastic member 47 is disposed in the concave groove 55. The elastic member 47 is positioned by the concave groove 55. The concave groove 55 may be provided only on the end surface 51 of the contact case 3. The concave groove 55 may be provided only on the bottom surface portion 44 of the inner case 28.

Figure 8:
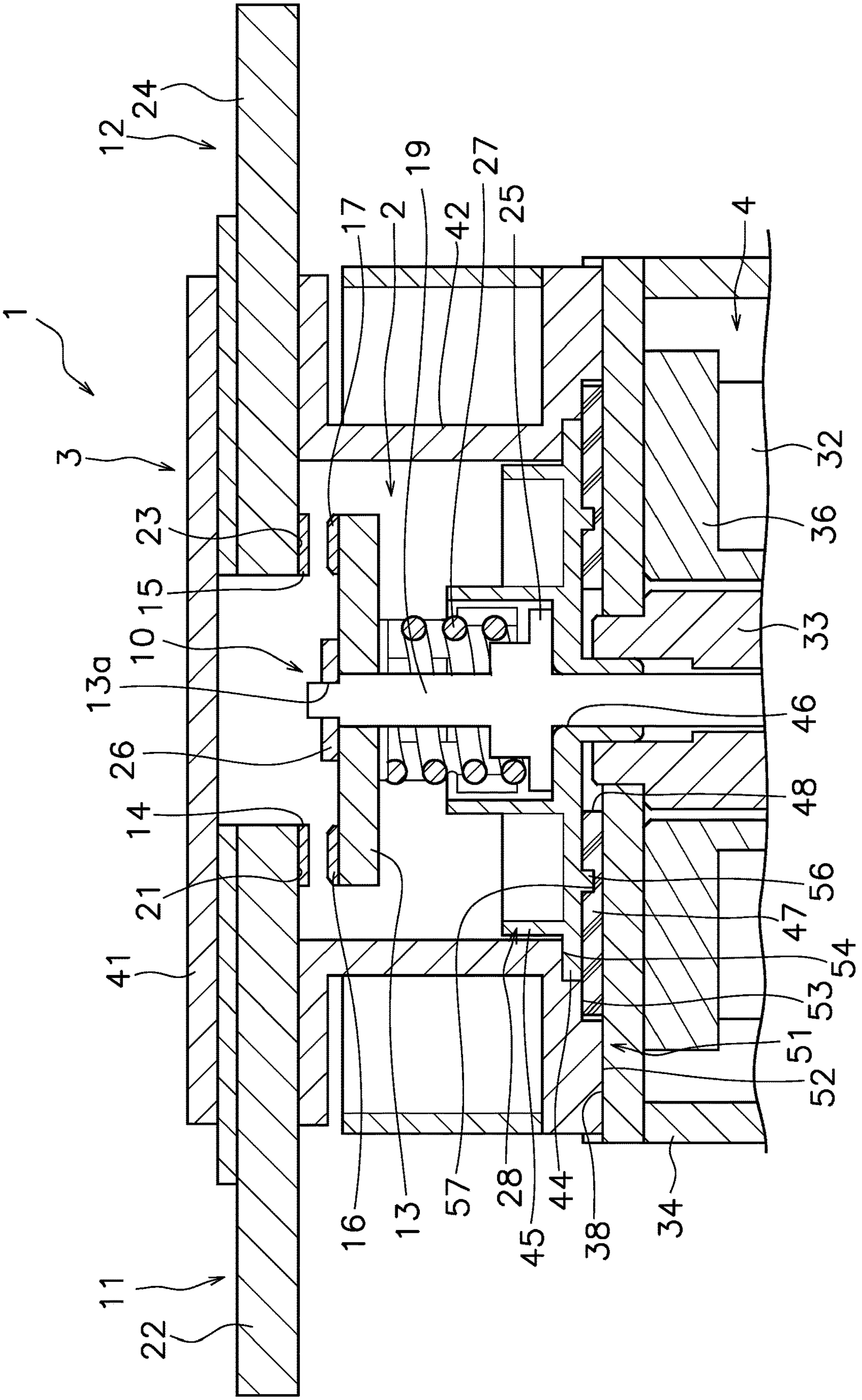
FIG. 8 is an enlarged sectional view of the electromagnetic relay according to a second modification.
Figure 9:
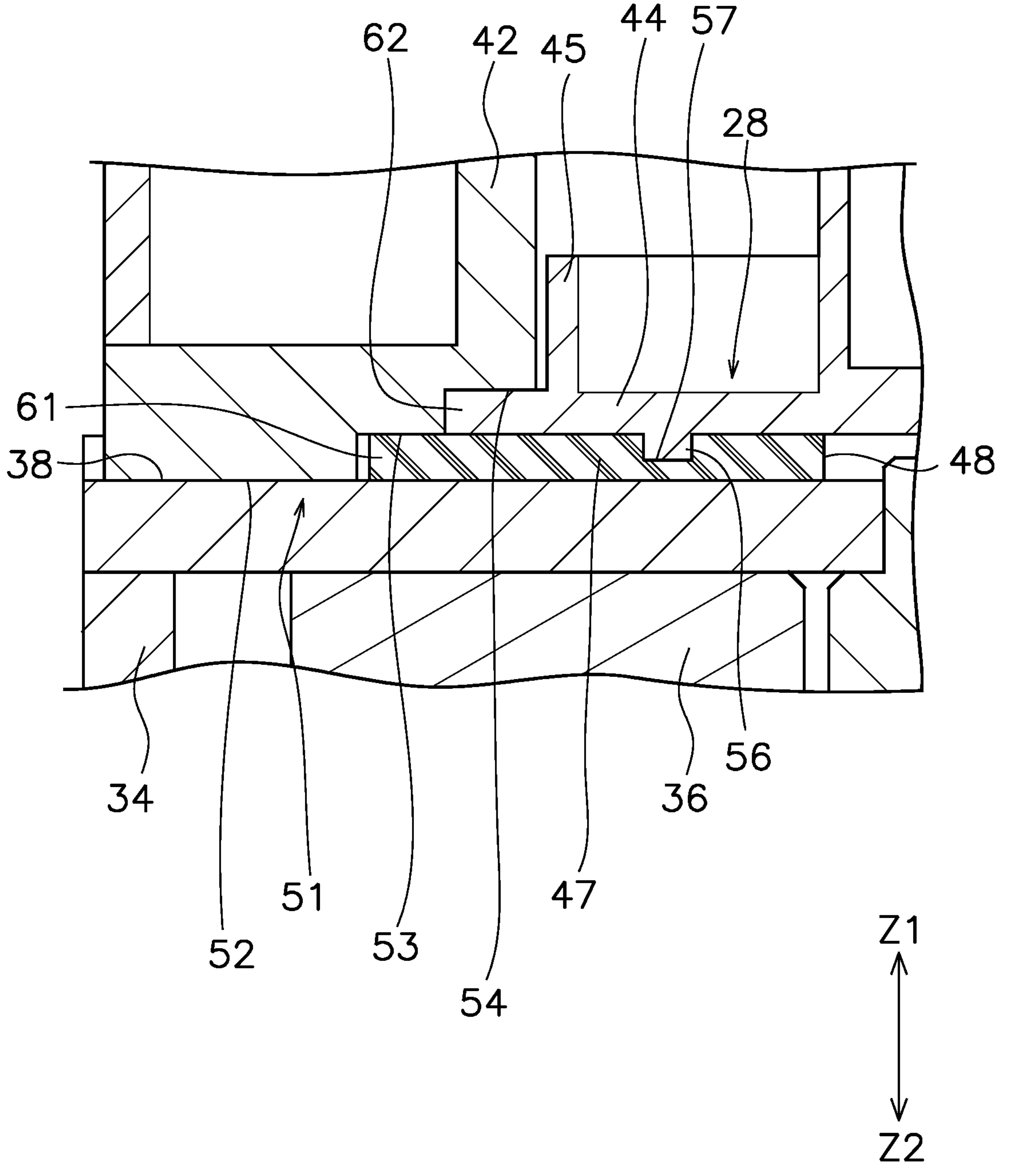
FIG. 9 is an enlarged sectional view of the elastic member and its surroundings according to the second modification.

FIG. 8 is an enlarged cross-sectional view of the electromagnetic relay 1 according to a second modification. FIG. 9 is an enlarged view of the elastic member 47 and its surroundings. In the second modification, the inner case 28 includes a protrusion 56. The protrusion 56 projects from the bottom surface portion 44 toward the elastic member 47. The elastic member 47 includes a recess 57 that faces the protrusion 56. The protrusion 56 is disposed in the recess 57. The elastic member 47 is positioned by the protrusion 56 of the inner case 28. The protrusion 56 and the recess 57 may have an annular shape. Alternatively, The protrusion 56 and the recess 57 may have other shapes such as a point shape, a straight line shape, and an arc shape. The recess 57 may be bottomed or may be a through hole.

Figure 10:
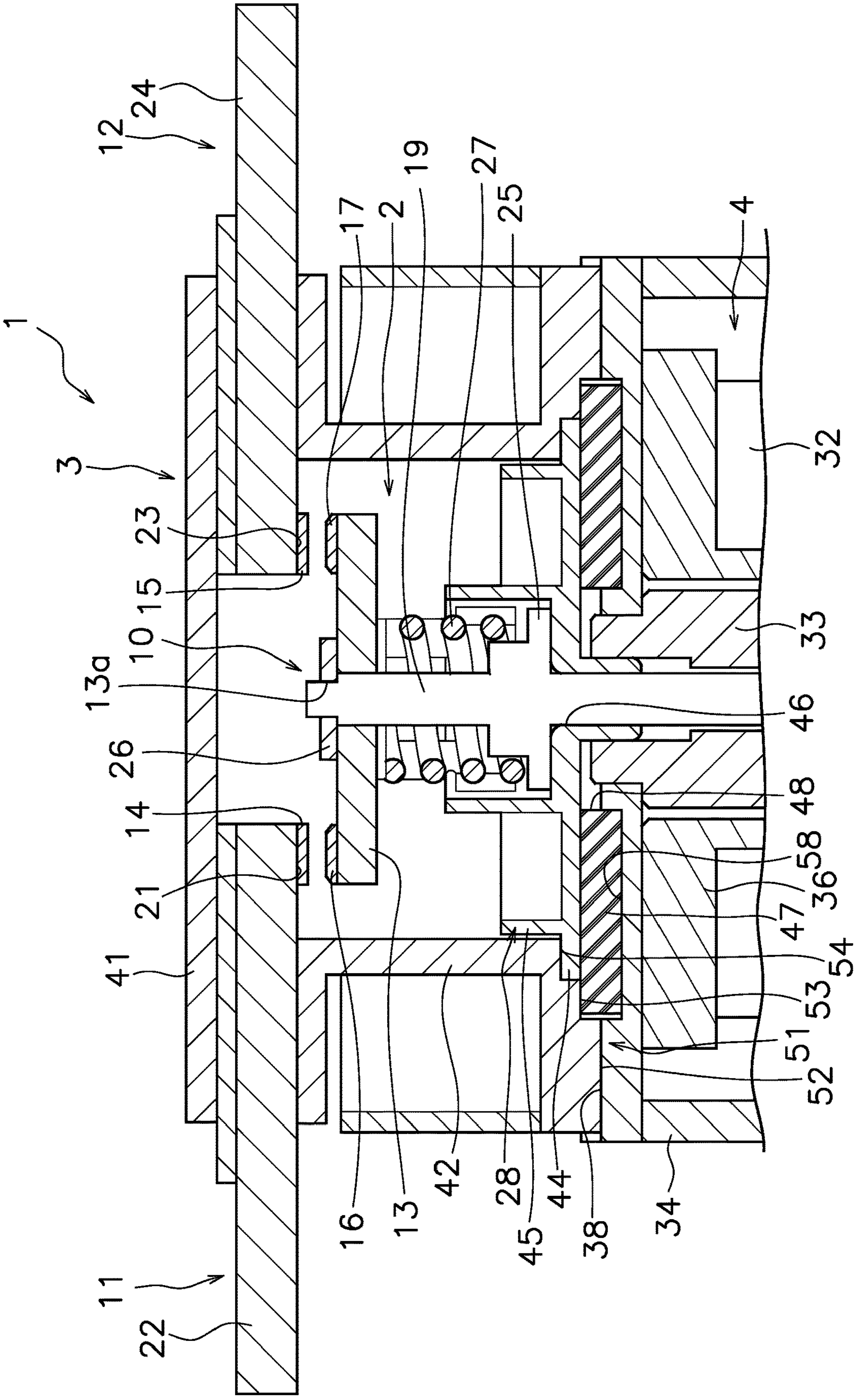
FIG. 10 is an enlarged sectional view of the electromagnetic relay according to a third modification.
Figure 11:
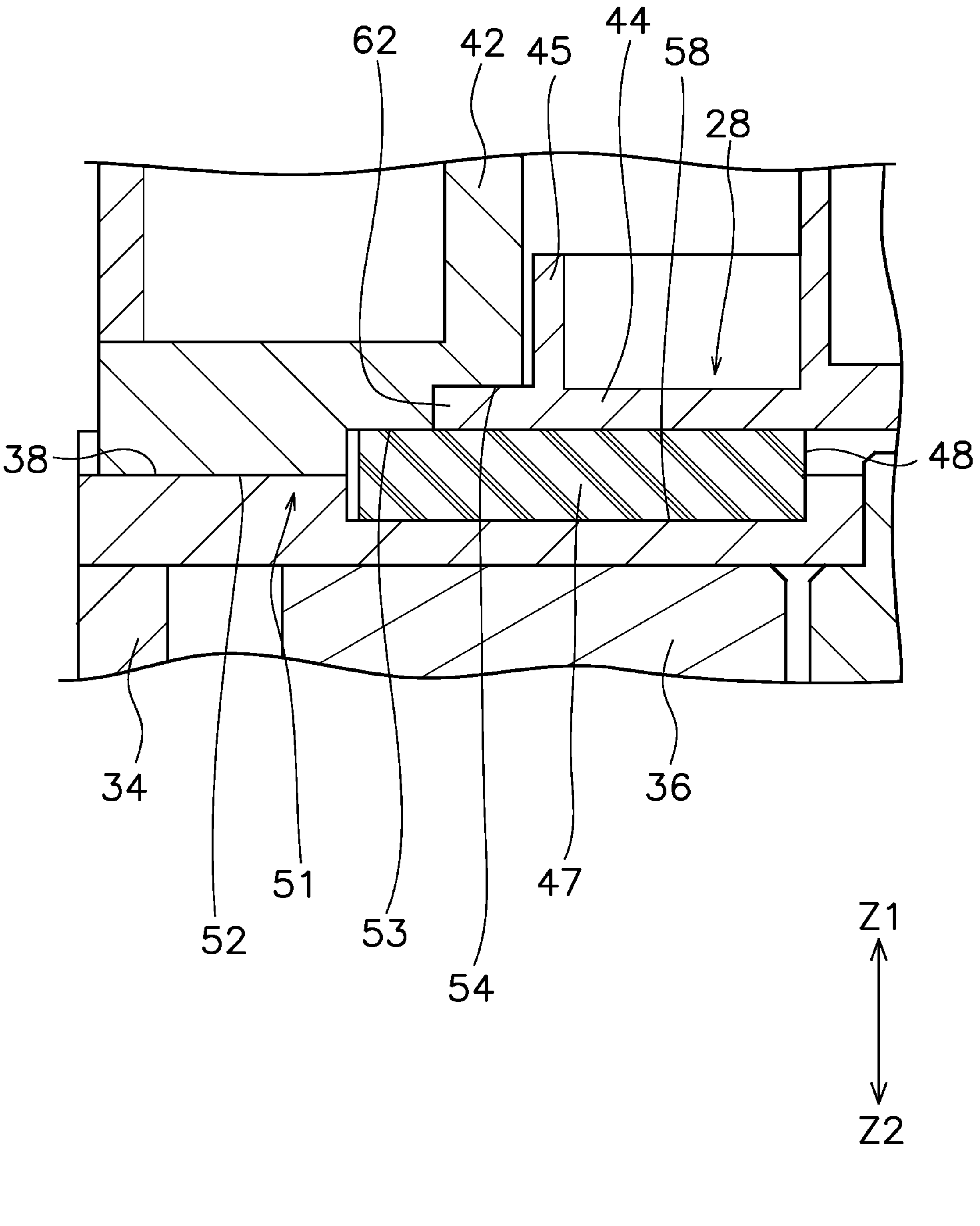
FIG. 11 is an enlarged sectional view of the elastic member and its surroundings according to the third modification.

FIG. 10 is an enlarged cross-sectional view of the electromagnetic relay 1 according to a third modification. FIG. 11 is an enlarged view of the elastic member 47 and its surroundings. In the third modification, the support surface 38 of the yoke 34 includes the recess 58. The recess 58 has an annular shape. The elastic member 47 is disposed in the recess 58. The elastic member 47 is positioned by the recess 57. The outer shape of the recess 58 has a shape corresponding to the outer shape of the elastic member 47.

In the above embodiment or modifications, the first step portion 53 or the second step portion 54 may be omitted. The support surface 38 is not limited to the yoke 34, and may be included in other parts of the drive device 4. For example, the drive device 4 may include a casing and the support surface 38 may be included in the casing. The electromagnetic relay is not limited to the plunger type described above, and may be another type of electromagnetic relay such as a hinge type.

Figure 12:
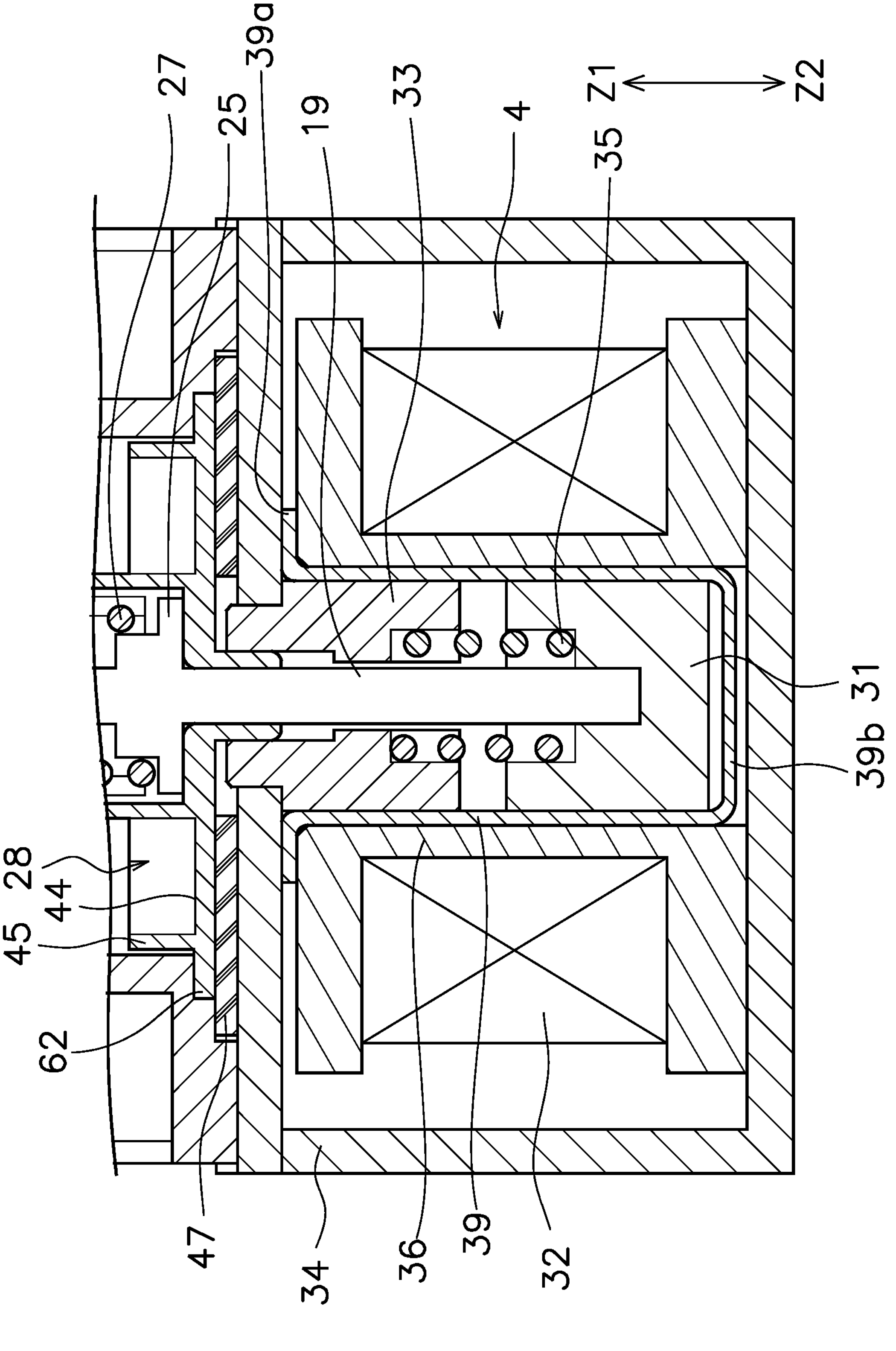
FIG. 12 is an enlarged sectional view of the electromagnetic relay according to a fourth modification.

FIG. 12 is an enlarged cross-sectional view of the electromagnetic relay 1 according to a fourth modification. As shown in FIG. 12, the electromagnetic relay 1 may further include a core case 39. The core case 39 is disposed in the spool 36. The movable iron core 31 and the fixed iron core 33 are disposed in the core case 39. The core case 39 has a cylindrical shape extending in an axial direction of the drive shaft 19. One end of the core case 39 is closed by the bottom 39*b*. The other end of the core case 39 is open. By connecting the core case 39 to the yoke 34, the inside of the core case 39 is sealed. Specifically, the core case 39 has a flange 39*a*. For example, the core case 39 is made of metal, and the flange 39*a* may be joined to the yoke 34 by welding.

REFERENCE SIGNS LIST

3: Contact case, 4: Drive device, 13: Movable contact piece, 14: First fixed contact, 16: First movable contact, 28: Inner case, 31: Movable iron core, 33: Fixed iron core, 32: Coil, 36: Spool, 38: Support surface, 42: Side wall, 46: Hole, 47: Elastic member, 48: Hole, 51: End surface, 52: Bottom end surface, 53: First step portion, 54: Second step portion, 55: Concave groove, 56: Protrusion, 57: Recess, 58: Recess

The invention claimed is:

1. An electromagnetic relay, comprising:
a fixed contact;
a movable contact disposed to face the fixed contact;
a movable contact piece connected to the movable contact, the movable contact piece being configured to move in an opening direction and a closing direction;
a contact case that houses the fixed contact, the movable contact, and the movable contact piece;
a drive device including a coil configured to generate an electromagnetic force to move the movable contact piece;
an elastic member disposed between the drive device and the contact case to seal between the drive device and the contact case;
a drive shaft connected to the movable contact piece, the drive shaft extending from the movable contact piece toward the drive device; and
an inner case disposed in the contact case, the inner case including a hole through which the drive shaft is disposed, the inner case being disposed to face the drive device,
wherein the elastic member seals between an outer edge of a bottom surface of the inner case and the contact case.

2. The electromagnetic relay according to claim 1,
wherein the contact case includes an end surface that faces the drive device and a step portion disposed inside the end surface, and
the elastic member is in contact with the step portion.

3. The electromagnetic relay according to claim 1,
wherein the contact case includes an end surface that faces the drive device and a concave groove disposed inside the end surface,
the elastic member is a seal ring, and
the elastic member is disposed in the concave groove.

4. The electromagnetic relay according to claim 1,
wherein the drive device includes a support surface that supports the contact case,
the support surface includes a recess, and
the elastic member is disposed in the recess.

5. The electromagnetic relay according to claim 1, further comprising a drive shaft connected to the movable contact piece, the drive shaft extending from the movable contact piece towards the drive device,
wherein the drive device includes
a spool around which the coil is wound,
a movable iron core disposed in the spool, the movable iron core being connected to the drive shaft, and
a fixed iron core that faces the movable iron core.

6. The electromagnetic relay according to claim 1, further comprising an inner case disposed in the contact case, the inner case including a hole into which the drive shaft is inserted and the inner case being disposed to face the drive device,
wherein the elastic member is disposed between the drive device and the inner case to seal between the drive device and the inner case.

7. An electromagnetic relay, comprising:
a fixed contact:
a movable contact disposed to face the fixed contact;
a movable contact piece connected to the movable contact, the movable contact piece being configured to move in an opening direction and a closing direction;
a contact case that houses the fixed contact, the movable contact, and the movable contact piece;
a drive device including a coil configured to generate an electromagnetic force to move the movable contact piece;
an elastic member disposed between the drive device and the contact case to seal between the drive device and the contact case; and
an inner case disposed in the contact case, the inner case including a hole into which the drive shaft is inserted and the inner case being disposed to face the drive device,
wherein the elastic member is disposed between the drive device and the inner case to seal between the drive device and the inner case,
the contact case includes an end surface, a first step portion located inside the end surface, and a second step portion located inside the first step portion,
the elastic member is in contact with the first step portion, and
the inner case is in contact with the second step portion.

8. An electromagnetic relay, comprising:
a fixed contact:
a movable contact disposed to face the fixed contact:
a movable contact piece connected to the movable contact, the movable contact piece being configured to move in an opening direction and a closing direction;
a contact case that houses the fixed contact, the movable contact, and the movable contact piece;
a drive device including a coil configured to generate an electromagnetic force to move the movable contact piece;
an elastic member disposed between the drive device and the contact case to seal between the drive device and the contact case; and
an inner case disposed in the contact case, the inner case including a hole into which the drive shaft is inserted and the inner case being disposed to face the drive device,
wherein the elastic member is disposed between the drive device and the inner case to seal between the drive device and the inner case,
the inner case includes a protrusion that protrudes toward the elastic member,
the elastic member includes a recess that faces the protrusion, and
the protrusion is disposed in the recess.

9. The electromagnetic relay according to claim 6, wherein the elastic member includes a hole into which the drive shaft is inserted.

10. The electromagnetic relay according to claim 6, wherein the inner case is made of resin.

11. The electromagnetic relay according to claim 1, wherein the contact case includes a side wall that laterally covers the fixed contact, the movable contact, and the movable contact piece, the side wall extends in an axial direction of the drive shaft, and the elastic member is in contact with an end surface of the contact case.

12. The electromagnetic relay according claim 1, wherein the elastic member has a sheet shape.

13. The electromagnetic relay according to claim 1, wherein the contact case is made of resin.

* * * * *